US009727226B2

(12) United States Patent
Leskelä et al.

(10) Patent No.: US 9,727,226 B2
(45) Date of Patent: Aug. 8, 2017

(54) METHODS AND APPARATUSES FOR PROVIDING AN ENHANCED USER INTERFACE

(75) Inventors: Jyrki Veikko Leskelä, Haukipudas (FI); Mika Allan Salmela, Oulu (FI); Jarmo Antero Nikula, Jääli (FI); Aki Happonen, Kiiminki (FI)

(73) Assignee: Nokia Technologies Oy, Espoo (FI)

( * ) Notice: Subject to any disclaimer, the term of this patent is extended or adjusted under 35 U.S.C. 154(b) by 814 days.

(21) Appl. No.: 12/753,476

(22) Filed: Apr. 2, 2010

(65) Prior Publication Data

US 2011/0246916 A1 Oct. 6, 2011

(51) Int. Cl.
*G06F 3/048* (2013.01)
*G06F 3/0488* (2013.01)

(52) U.S. Cl.
CPC .. *G06F 3/0488* (2013.01); *G06F 2203/04804* (2013.01); *G09G 2340/10* (2013.01); *G09G 2354/00* (2013.01)

(58) Field of Classification Search
CPC .................. G06F 3/048; G06F 3/0488; G06F 2203/04804
USPC ................................ 715/764, 768, 769, 701
See application file for complete search history.

(56) References Cited

U.S. PATENT DOCUMENTS

| 8,127,240 B2 * | 2/2012 | Grotjohn et al. ............. 715/769 |
| 2003/0071850 A1 | 4/2003 | Geidl |
| 2003/0193481 A1 * | 10/2003 | Sokolsky ..................... 345/173 |
| 2004/0008191 A1 | 1/2004 | Poupyrev et al. |
| 2004/0075670 A1 * | 4/2004 | Bezine et al. ................ 345/619 |
| 2006/0059432 A1 * | 3/2006 | Bells ............................. 715/768 |
| 2007/0061722 A1 | 3/2007 | Kronlund et al. |
| 2007/0139430 A1 * | 6/2007 | Korn et al. ................... 345/581 |
| 2007/0275736 A1 | 11/2007 | Baek et al. |
| 2008/0153551 A1 | 6/2008 | Baek et al. |
| 2008/0163053 A1 | 7/2008 | Hwang et al. |

(Continued)

FOREIGN PATENT DOCUMENTS

| CN | 1125492 A | 6/1996 |
| CN | 1932761 A | 3/2007 |

(Continued)

OTHER PUBLICATIONS

Search Report and Written Opinion for International Application No. PCT/FI2011/050097, mailed Jun. 23, 2011.

(Continued)

*Primary Examiner* — Andrey Belousov
(74) *Attorney, Agent, or Firm* — Alston & Bird LLP

(57) ABSTRACT

Methods and apparatuses are provided for providing an enhanced user interface. A method may include causing display of a semi-transparent user interface layer concurrent with a second user interface layer. At least a portion of the semi-transparent user interface layer and at least a portion of the second user interface layer may overlap. The method may further include detecting a physical stimulus. The method may additionally include determining an effect of the physical stimulus on display of content in the semi-transparent user interface layer. The method may also include applying the determined effect by modifying display of content in the semi-transparent user interface layer in response to detection of the physical stimulus. Corresponding apparatuses are also provided.

19 Claims, 7 Drawing Sheets

(56) References Cited

U.S. PATENT DOCUMENTS

| | | | |
|---|---|---|---|
| 2008/0168366 A1* | 7/2008 | Kocienda | G06F 3/0237 715/764 |
| 2008/0215983 A1* | 9/2008 | Wierowski | G06F 3/0482 715/723 |
| 2009/0094555 A1 | 4/2009 | Viitala | |
| 2009/0178010 A1 | 7/2009 | Chaudhri | |
| 2009/0193344 A1 | 7/2009 | Smyers | |
| 2009/0289924 A1 | 11/2009 | Takata | |
| 2010/0057875 A1* | 3/2010 | Bychkov et al. | 709/206 |
| 2011/0202834 A1* | 8/2011 | Mandryk et al. | 715/701 |

FOREIGN PATENT DOCUMENTS

| | | |
|---|---|---|
| EP | 1 860 856 A2 | 11/2007 |
| KR | 2009-0128254 | 12/2009 |
| WO | WO 94/27227 A1 | 11/1994 |
| WO | WO 01/15132 A1 | 3/2001 |

OTHER PUBLICATIONS

Office Action for Korean Application No. 2012-7028748 dated Nov. 29, 2013.

Office Action for Korean Application No. 2012/7028748 dated Aug. 19, 2014.

Office Action from Korean Patent Application No. 2012-7028748 dated Dec. 12, 2014.

Nexus One: Live Wallpapers [online] [retrieved from the internet Mar. 24, 2010] https://www.youtube.com/watch?v=Hz1YBcYw_qE (dated Jan. 7, 2010); 1 page.

Technologies—GreatApps [online] [retrieved from the internet Mar. 24, 2010] http://greatapps.co.uk/technologies/ (dated Mar. 24, 2010); 8 pages.

Android Service Wallpaper; Android Developers [online] [retrieved from the internet Mar. 24, 2010] http://developer.android.com/reference/android/service/wallpaper/package-summary.html (dated Mar. 10, 2010); 2 pages.

Office Action from Chinese Patent Application No. 201180017381.9 dated Aug. 19, 2014.

Office Action for corresponding Chinese Application No. 201180017381.9 dated Sep. 30, 2015.

Office Action and Search Report from corresponding Taiwanese Patent Application No. 100111588, dated Aug. 18, 2015.

Extended European Search Report for corresponding European Application No. 11762066.6 dated Apr. 28, 2016, 10 pages.

* cited by examiner

METHODS AND APPARATUSES FOR PROVIDING AN ENHANCED USER INTERFACE

TECHNOLOGICAL FIELD

Embodiments of the present invention relate generally to user interface technology and, more particularly, some example embodiments relate to methods and apparatuses for providing an enhanced user interface.

BACKGROUND

The modern computing era has brought about a tremendous expansion in computing power as well as increased affordability of computing devices. This expansion in computing power has led to a reduction in the size of computing devices and given rise to a new generation of mobile devices that are capable of performing functionality that only a few years ago required processing power provided only by the most advanced desktop computers. Consequently, mobile computing devices having a small form factor have become ubiquitous and are used for execution of a wide range of applications. However, to date evolution of user interface technology has lagged the evolution of computing devices on which user interfaces are implemented.

BRIEF SUMMARY

Methods, apparatuses, and computer program products are herein provided for providing an enhanced user interface. Methods, apparatuses, and computer program products in accordance with various embodiments may provide several advantages to computing devices and computing device users. Some example embodiments provide a semi-transparent user interface layer that is displayed concurrent with a second user interface layer. In some example embodiments, the semi-transparent user interface layer is configured to display interactive animations, information, and/or other content concurrent with information, application interface(s), and/or the like displayed in the second user interface layer. In this regard, the semi-transparency of the semi-transparent user interface layer may allow for display of additional content without interfering with content displayed in the second user interface layer. Some example embodiments further provide for detection of a physical stimulus, such as physical stimulus of a display on which the semi-transparent user interface is displayed and/or physical stimulus of a computing device on which the semi-transparent user interface is displayed. Some such example embodiments are configured to apply an effect to content displayed in the semi-transparent user interface layer in response to detection of physical stimulus. Accordingly, content displayed in the semi-transparent user interface may be user-interactive content providing a visually rich user experience, which may enhance user experience over conventional user interfaces.

In a first example embodiment, a method is provided, which comprises causing display of a semi-transparent user interface layer concurrent with a second user interface layer. In this example embodiment, at least a portion of the semi-transparent user interface layer and at least a portion of the second user interface layer overlap. The method of this embodiment further comprises detecting a physical stimulus. The method of this embodiment also comprises determining an effect of the physical stimulus on display of content in the semi-transparent user interface layer. The method of this embodiment additionally comprises applying the determined effect by modifying display of content in the semi-transparent user interface layer in response to detection of the physical stimulus.

In another example embodiment, an apparatus is provided. The apparatus of this embodiment comprises at least one processor and at least one memory storing computer program code, wherein the at least one memory and stored computer program code are configured, with the at least one processor, to cause the apparatus to at least cause display of a semi-transparent user interface layer concurrent with a second user interface layer. In this example embodiment, at least a portion of the semi-transparent user interface layer and at least a portion of the second user interface layer overlap. The at least one memory and stored computer program code are configured, with the at least one processor, to further cause the apparatus of this embodiment to detect a physical stimulus. The at least one memory and stored computer program code are configured, with the at least one processor, to additionally cause the apparatus of this embodiment to determine an effect of the physical stimulus on display of content in the semi-transparent user interface layer. The at least one memory and stored computer program code are configured, with the at least one processor, to also cause the apparatus of this embodiment to apply the determined effect by modifying display of content in the semi-transparent user interface layer in response to detection of the physical stimulus.

In another example embodiment, a computer program product is provided. The computer program product of this embodiment includes at least one computer-readable storage medium having computer-readable program instructions stored therein. The program instructions of this embodiment comprise program instructions configured to cause display of a semi-transparent user interface layer concurrent with a second user interface layer. In this example embodiment, at least a portion of the semi-transparent user interface layer and at least a portion of the second user interface layer overlap. The program instructions of this embodiment further comprise program instructions configured to detect a physical stimulus. The program instructions of this embodiment additionally comprise program instructions configured to determine an effect of the physical stimulus on display of content in the semi-transparent user interface layer. The program instructions of this embodiment also comprise program instructions configured to apply the determined effect by modifying display of content in the semi-transparent user interface layer in response to detection of the physical stimulus.

In another example embodiment, an apparatus is provided that comprises means for causing display of a semi-transparent user interface layer concurrent with a second user interface layer. In this example embodiment, at least a portion of the semi-transparent user interface layer and at least a portion of the second user interface layer overlap. The apparatus of this embodiment further comprises means for detecting a physical stimulus. The apparatus of this embodiment additionally comprises means for determining an effect of the physical stimulus on display of content in the semi-transparent user interface layer. The apparatus of this embodiment also comprises means for applying the determined effect by modifying display of content in the semi-transparent user interface layer in response to detection of the physical stimulus.

The above summary is provided merely for purposes of summarizing some example embodiments of the invention so as to provide a basic understanding of some aspects of the invention. Accordingly, it will be appreciated that the above described example embodiments are merely examples and should not be construed to narrow the scope or spirit of the invention in any way. It will be appreciated that the scope of the invention encompasses many potential embodiments, some of which will be further described below, in addition to those here summarized.

BRIEF DESCRIPTION OF THE DRAWING(S)

Having thus described embodiments of the invention in general terms, reference will now be made to the accompanying drawings, which are not necessarily drawn to scale, and wherein:

DETAILED DESCRIPTION

Figure 1:
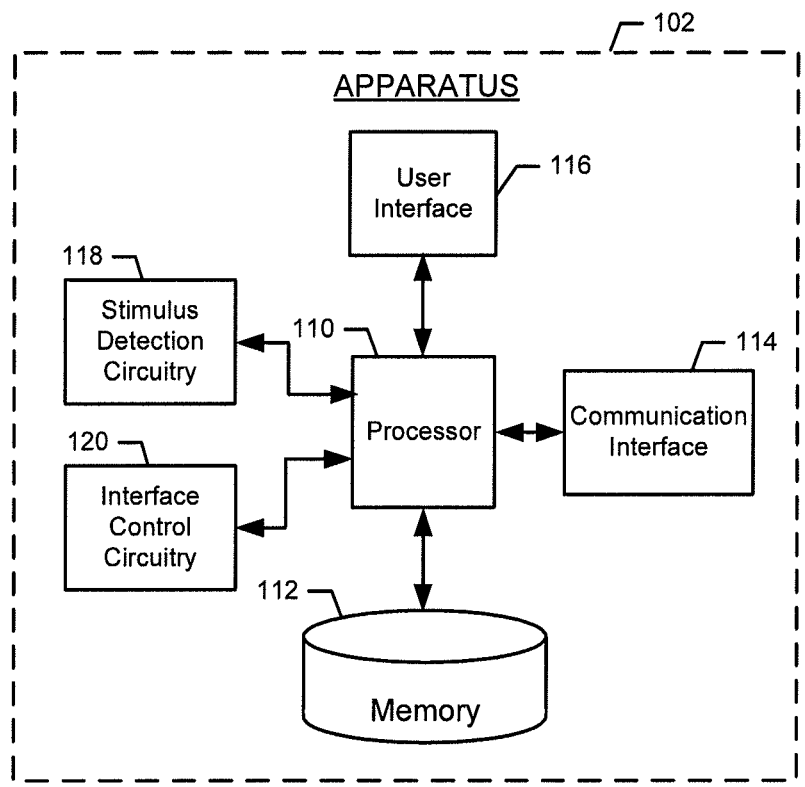
FIG. 1 illustrates a block diagram of an apparatus for providing an enhanced user interface according to an example embodiment of the present invention.

Some embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like reference numerals refer to like elements throughout.

As used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

FIG. 1 illustrates a block diagram of an apparatus 102 for providing an enhanced user interface according to an example embodiment of the present invention. It will be appreciated that the apparatus 102 is provided as an example of one embodiment of the invention and should not be construed to narrow the scope or spirit of the invention in any way. In this regard, the scope of the disclosure encompasses many potential embodiments in addition to those illustrated and described herein. As such, while FIG. 1 illustrates one example of a configuration of an apparatus for providing an enhanced user interface, numerous other configurations may also be used to implement embodiments of the present invention.

The apparatus 102 may be embodied as a desktop computer, laptop computer, mobile terminal, mobile computer, mobile phone, mobile communication device, one or more servers, one or more network nodes, game device, digital camera/camcorder, audio/video player, television device, radio receiver, digital video recorder, positioning device, any combination thereof, and/or the like. In this regard, the apparatus 102 may comprise any computing device configured to cause display of a semi-transparent user interface layer according to one or more example embodiments on a display of the apparatus 102 or on a display operably connected to the apparatus 102. In an example embodiment, the apparatus 102 is embodied as a mobile terminal, such as that illustrated in FIG. 2.

Figure 2:
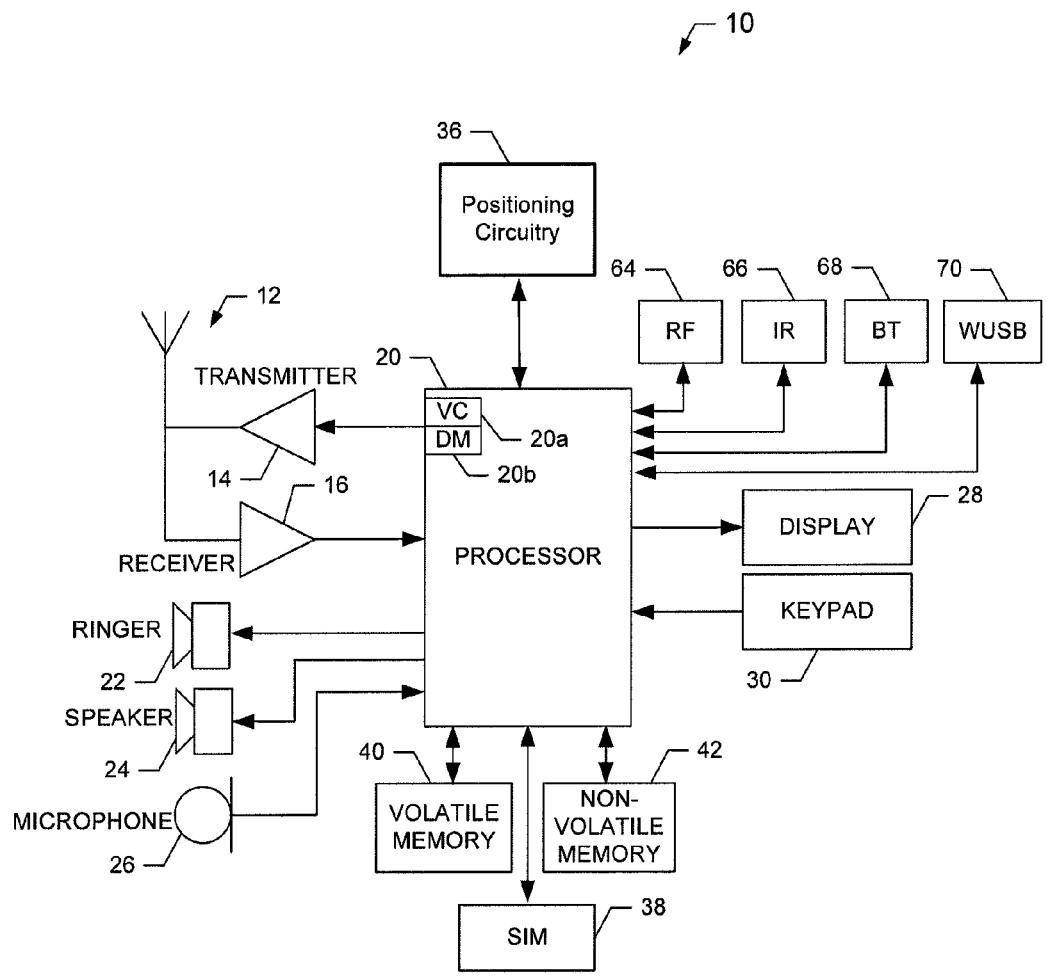
FIG. 2 is a schematic block diagram of a mobile terminal according to an example embodiment of the present invention.

In this regard, FIG. 2 illustrates a block diagram of a mobile terminal 10 representative of one embodiment of an apparatus 102. It should be understood, however, that the mobile terminal 10 illustrated and hereinafter described is merely illustrative of one type of apparatus 102 that may implement and/or benefit from embodiments of the present invention and, therefore, should not be taken to limit the scope of the present invention. While several embodiments of the electronic device are illustrated and will be hereinafter described for purposes of example, other types of electronic devices, such as mobile telephones, mobile computers, portable digital assistants (PDAs), pagers, laptop computers, desktop computers, gaming devices, televisions, and other types of electronic systems, may employ embodiments of the present invention.

As shown, the mobile terminal 10 may include an antenna 12 (or multiple antennas 12) in communication with a transmitter 14 and a receiver 16. The mobile terminal 10 may also include a processor 20 configured to provide signals to and receive signals from the transmitter and receiver, respectively. The processor 20 may, for example, be embodied as various means including circuitry, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 2 as a single processor, in some embodiments the processor 20 comprises a plurality of processors. These signals sent and received by the processor 20 may include signaling information in accordance with an air interface standard of an applicable cellular system, and/or any number of different wireline or wireless networking techniques, comprising but not limited to Wireless-Fidelity (Wi-Fi), wireless local access network (WLAN) techniques such as Institute of Electrical and Electronics Engineers (IEEE)

802.11, 802.16, and/or the like. In addition, these signals may include speech data, user generated data, user requested data, and/or the like. In this regard, the mobile terminal may be capable of operating with one or more air interface standards, communication protocols, modulation types, access types, and/or the like. More particularly, the mobile terminal may be capable of operating in accordance with various first generation (1G), second generation (2G), 2.5G, third-generation (3G) communication protocols, fourth-generation (4G) communication protocols, Internet Protocol Multimedia Subsystem (IMS) communication protocols (e.g., session initiation protocol (SIP)), and/or the like. For example, the mobile terminal may be capable of operating in accordance with 2G wireless communication protocols IS-136 (Time Division Multiple Access (TDMA)), Global System for Mobile communications (GSM), IS-95 (Code Division Multiple Access (CDMA)), and/or the like. Also, for example, the mobile terminal may be capable of operating in accordance with 2.5G wireless communication protocols General Packet Radio Service (GPRS), Enhanced Data GSM Environment (EDGE), and/or the like. Further, for example, the mobile terminal may be capable of operating in accordance with 3G wireless communication protocols such as Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The mobile terminal may be additionally capable of operating in accordance with 3.9G wireless communication protocols such as Long Term Evolution (LTE) or Evolved Universal Terrestrial Radio Access Network (E-UTRAN) and/or the like. Additionally, for example, the mobile terminal may be capable of operating in accordance with fourth-generation (4G) wireless communication protocols and/or the like as well as similar wireless communication protocols that may be developed in the future.

Some Narrow-band Advanced Mobile Phone System (NAMPS), as well as Total Access Communication System (TACS), mobile terminals may also benefit from embodiments of this invention, as should dual or higher mode phones (e.g., digital/analog or TDMA/CDMA/analog phones). Additionally, the mobile terminal 10 may be capable of operating according to Wireless Fidelity (Wi-Fi) or Worldwide Interoperability for Microwave Access (Wi-MAX) protocols.

It is understood that the processor 20 may comprise circuitry for implementing audio/video and logic functions of the mobile terminal 10. For example, the processor 20 may comprise a digital signal processor device, a microprocessor device, an analog-to-digital converter, a digital-to-analog converter, and/or the like. Control and signal processing functions of the mobile terminal may be allocated between these devices according to their respective capabilities. The processor may additionally comprise an internal voice coder (VC) 20a, an internal data modem (DM) 20b, and/or the like. Further, the processor may comprise functionality to operate one or more software programs, which may be stored in memory. For example, the processor 20 may be capable of operating a connectivity program, such as a web browser. The connectivity program may allow the mobile terminal 10 to transmit and receive web content, such as location-based content, according to a protocol, such as Wireless Application Protocol (WAP), hypertext transfer protocol (HTTP), and/or the like. The mobile terminal 10 may be capable of using a Transmission Control Protocol/Internet Protocol (TCP/IP) to transmit and receive web content across the internet or other networks.

The mobile terminal 10 may also comprise a user interface including, for example, an earphone or speaker 24, a ringer 22, a microphone 26, a display 28, a user input interface, and/or the like, which may be operationally coupled to the processor 20. In this regard, the processor 20 may comprise user interface circuitry configured to control at least some functions of one or more elements of the user interface, such as, for example, the speaker 24, the ringer 22, the microphone 26, the display 28, and/or the like. The processor 20 and/or user interface circuitry comprising the processor 20 may be configured to control one or more functions of one or more elements of the user interface through computer program instructions (e.g., software and/or firmware) stored on a memory accessible to the processor 20 (e.g., volatile memory 40, non-volatile memory 42, and/or the like). Although not shown, the mobile terminal may comprise a battery for powering various circuits related to the mobile terminal, for example, a circuit to provide mechanical vibration as a detectable output. The user input interface may comprise devices allowing the mobile terminal to receive data, such as a keypad 30, a touch display (not shown), a joystick (not shown), and/or other input device. In embodiments including a keypad, the keypad may comprise numeric (0-9) and related keys (#, *), and/or other keys for operating the mobile terminal.

As shown in FIG. 2, the mobile terminal 10 may also include one or more means for sharing and/or obtaining data. For example, the mobile terminal may comprise a short-range radio frequency (RF) transceiver and/or interrogator 64 so data may be shared with and/or obtained from electronic devices in accordance with RF techniques. The mobile terminal may comprise other short-range transceivers, such as, for example, an infrared (IR) transceiver 66, a Bluetooth™ (BT) transceiver 68 operating using Bluetooth™ brand wireless technology developed by the Bluetooth™ Special Interest Group, a wireless universal serial bus (USB) transceiver 70 and/or the like. The Bluetooth™ transceiver 68 may be capable of operating according to ultra-low power Bluetooth™ technology (e.g., Wibree™) radio standards. In this regard, the mobile terminal 10 and, in particular, the short-range transceiver may be capable of transmitting data to and/or receiving data from electronic devices within a proximity of the mobile terminal, such as within 10 meters, for example. Although not shown, the mobile terminal may be capable of transmitting and/or receiving data from electronic devices according to various wireless networking techniques, including Wireless Fidelity (Wi-Fi), WLAN techniques such as IEEE 802.11 techniques, IEEE 802.15 techniques, IEEE 802.16 techniques, and/or the like.

The mobile terminal 10 may include positioning circuitry 36. The positioning circuitry 36 may include, for example, a global positioning system (GPS) sensor, an assisted global positioning system (Assisted-GPS) sensor, and/or the like. In one embodiment, however, the positioning circuitry 36 includes a pedometer, accelerometer, and/or inertial sensor. Further, the positioning circuitry 36 may be configured to determine the location of the mobile terminal based upon signal triangulation or other mechanisms. The positioning circuitry 36 is configured in some embodiments to determine a location of the mobile terminal, such as latitude and longitude coordinates of the mobile terminal or a position relative to a reference point such as a destination or a start point. Information from the positioning circuitry 36 may be communicated to a memory of the mobile terminal or to another memory device to be stored as a position history, location information, motion information, and/or the like. Furthermore, the memory of the mobile terminal may store instructions for determining cell id information. In this regard, the memory may store an application program for execution by the processor 20, which determines an identity of the current cell, e.g., cell id identity or cell id information, with which the mobile terminal is in communication. In conjunction with the positioning circuitry 36, the cell id information may be used to more accurately determine a location of the mobile terminal. In embodiments wherein the positioning circuitry 36 comprises a pedometer, accelerometer, and/or an inertial sensor, the positioning circuitry 36 may be configured to determine a state of motion of the mobile terminal 10. In embodiments where the positioning circuitry 36 comprises a GPS sensor or the like, a state of motion of the mobile terminal 10 may also be determined. In this regard, the positioning circuitry 36 may be configured to determine whether the mobile terminal 10 is in motion based upon whether the location of the mobile terminal 10 is changing over an interval 10. The positioning circuitry 36 may be further configured to determine a degree or severity of this state of motion based upon, for example, the distance traveled by the mobile terminal 10 over a time interval.

The mobile terminal 10 may comprise memory, such as a subscriber identity module (SIM) 38, a removable user identity module (R-UIM), and/or the like, which may store information elements related to a mobile subscriber. In addition to the SIM, the mobile terminal may comprise other removable and/or fixed memory. The mobile terminal 10 may include volatile memory 40 and/or non-volatile memory 42. For example, volatile memory 40 may include Random Access Memory (RAM) including dynamic and/or static RAM, on-chip or off-chip cache memory, and/or the like. Non-volatile memory 42, which may be embedded and/or removable, may include, for example, read-only memory, flash memory, magnetic storage devices (e.g., hard disks, floppy disk drives, magnetic tape, etc.), optical disc drives and/or media, non-volatile random access memory (NVRAM), and/or the like. Like volatile memory 40 non-volatile memory 42 may include a cache area for temporary storage of data. The memories may store one or more software programs, instructions, pieces of information, data, and/or the like which may be used by the mobile terminal for performing functions of the mobile terminal. For example, the memories may comprise an identifier, such as an international mobile equipment identification (IMEI) code, capable of uniquely identifying the mobile terminal 10.

Returning to FIG. 1, in an example embodiment, the apparatus 102 includes various means for performing the various functions herein described. These means of the apparatus 102 may include, for example, one or more of a processor 110, memory 112, communication interface 114, user interface 116, stimulus detection circuitry 118, or interface control circuitry 120. These means of the apparatus 102 as described herein may be embodied as, for example, circuitry, hardware elements (e.g., a suitably programmed processor, combinational logic circuit, and/or the like), a computer program product comprising computer-readable program instructions (e.g., software or firmware) stored on a computer-readable medium (e.g. memory 112) that is executable by a suitably configured processing device (e.g., the processor 110), or some combination thereof.

The processor 110 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 1 as a single processor, in some embodiments the processor 110 comprises a plurality of processors. The plurality of processors may be in operative communication with each other and may be collectively configured to perform one or more functionalities of the apparatus 102 as described herein. The plurality of processors may be embodied on a single computing device or distributed across a plurality of computing devices collectively configured to function as the apparatus 102. In embodiments wherein the apparatus 102 is embodied as a mobile terminal 10, the processor 110 may be embodied as or comprise the processor 20. In an example embodiment, the processor 110 is configured to execute instructions stored in the memory 112 or otherwise accessible to the processor 110. These instructions, when executed by the processor 110, may cause the apparatus 102 to perform one or more of the functionalities of the apparatus 102 as described herein. As such, whether configured by hardware or software methods, or by a combination thereof, the processor 110 may comprise an entity capable of performing operations according to embodiments of the present invention while configured accordingly. Thus, for example, when the processor 110 is embodied as an ASIC, FPGA or the like, the processor 110 may comprise specifically configured hardware for conducting one or more operations described herein. Alternatively, as another example, when the processor 110 is embodied as an executor of instructions, such as may be stored in the memory 112, the instructions may specifically configure the processor 110 to perform one or more algorithms and operations described herein.

The memory 112 may comprise, for example, volatile memory, non-volatile memory, or some combination thereof. Although illustrated in FIG. 1 as a single memory, the memory 112 may comprise a plurality of memories. The plurality of memories may be embodied on a single computing device or may be distributed across a plurality of computing devices collectively configured to function as the apparatus 102. In various example embodiments, the memory 112 may comprise, for example, a hard disk, random access memory, cache memory, flash memory, a compact disc read only memory (CD-ROM), digital versatile disc read only memory (DVD-ROM), an optical disc, circuitry configured to store information, or some combination thereof. In embodiments wherein the apparatus 102 is embodied as a mobile terminal 10, the memory 112 may comprise the volatile memory 40 and/or the non-volatile memory 42. The memory 112 may be configured to store information, data, applications, instructions, or the like for enabling the apparatus 102 to carry out various functions in accordance with example embodiments of the present invention. For example, in at least some embodiments, the memory 112 is configured to buffer input data for processing by the processor 110. Additionally or alternatively, in at least some embodiments, the memory 112 is configured to store program instructions for execution by the processor 110. The memory 112 may store information in the form of static and/or dynamic information. The stored information may include, for example, content for display in a user interface, user interface applications, and/or the like. This stored information may be stored and/or used by the stimulus detection circuitry 118 and/or interface control circuitry 120 during the course of performing their respective functionalities.

The communication interface 114 may be embodied as any device or means embodied in circuitry, hardware, a computer program product comprising computer readable program instructions stored on a computer readable medium (e.g., the memory 112) and executed by a processing device (e.g., the processor 110), or a combination thereof that is configured to receive and/or transmit data from/to an entity, such as over a network by which the apparatus 102 is in communication with the entity. The communication interface 114 may include, for example, an antenna, a transmitter, a receiver, a transceiver and/or supporting hardware or software for enabling communications with one or more remote computing devices, such as over a network. The communication interface 114 may be configured to receive and/or transmit data using any protocol that may be used for communications between computing devices. In this regard, the communication interface 114 may be configured to receive and/or transmit data using any protocol that may be used for transmission of data over a wireless network, wireline network, some combination thereof, or the like by which the apparatus 102 and one or more computing devices are in communication. In an example embodiment, the communication interface 114 is at least partially embodied as or otherwise controlled by the processor 110. In this regard, the communication interface 114 may be in communication with the processor 110, such as via a bus. The communication interface 114 may additionally be in communication with the memory 112, user interface 116, stimulus detection circuitry 118, and/or interface control circuitry 120, such as via a bus.

The user interface 116 may be in communication with the processor 110 to receive an indication of a user input and/or to provide an audible, visual, mechanical, or other output to a user. As such, the user interface 116 may include, for example, a keyboard, a mouse, a joystick, a display, a touch screen display, a microphone, a speaker, and/or other input/output mechanisms. The user interface 116 may be in communication with the memory 112, communication interface 114, stimulus detection circuitry 118, and/or interface control circuitry 120, such as via a bus.

The stimulus detection circuitry 118 may be embodied as various means, such as circuitry, hardware, a computer program product comprising computer readable program instructions stored on a computer readable medium (e.g., the memory 112) and executed by a processing device (e.g., the processor 110), or some combination thereof and, in one embodiment, is embodied as or otherwise controlled by the processor 110. In embodiments wherein the stimulus detection circuitry 118 is embodied separately from the processor 110, the stimulus detection circuitry 118 may be in communication with the processor 110. The stimulus detection circuitry 118 may further be in communication with one or more of the memory 112, communication interface 114, user interface 116, or interface control circuitry 120, such as via a bus.

The stimulus detection circuitry 118 may be configured to detect a physical stimulus to the user interface 116 and/or to the apparatus 102. In this regard, the stimulus detection circuitry 118 may be in communication with a touch screen display of the user interface 116 to detect a touch input to the touch screen display and/or characteristics associated therewith. As an additional example, the stimulus detection circuitry 118 may be configured to detect a voice input to a microphone or other audio sensor of the user interface 116 and/or vocal characteristics of the voice input. As another example, the stimulus detection circuitry 118 may comprise a global positioning system (GPS) sensor, an assisted global positioning system (Assisted-GPS) sensor, and/or the like configured to ascertain a location of the apparatus 102. As a further example, the stimulus detection circuitry 118 may comprise a pedometer, accelerometer, inertial sensor, and/or the like configured to detect a state of motion of the apparatus 102, characteristics of motion of the apparatus 102, a change in orientation of the apparatus 102, and/or the like. Information detected by the stimulus detection circuitry 118 may be communicated to the memory 112 for storage as physical stimulus information that may be accessed and/or otherwise used by the interface control circuitry 120 as will be described further herein below. Additionally or alternatively, the stimulus detection circuitry 118 may be configured to communicate detected information to the interface control circuitry 120. In embodiments wherein the apparatus 102 is embodied as a mobile terminal 10, the stimulus detection circuitry 118 may comprise the positioning circuitry 36.

The interface control circuitry 120 may be embodied as various means, such as circuitry, hardware, a computer program product comprising computer readable program instructions stored on a computer readable medium (e.g., the memory 112) and executed by a processing device (e.g., the processor 110), or some combination thereof and, in one embodiment, is embodied as or otherwise controlled by the processor 110. In embodiments wherein the interface control circuitry 120 is embodied separately from the processor 110, the interface control circuitry 120 may be in communication with the processor 110. The interface control circuitry 120 may further be in communication with one or more of the memory 112, communication interface 114, user interface 116, or stimulus detection circuitry 118, such as via a bus.

The interface control circuitry 120 is configured in some example embodiments to cause display of a semi-transparent user interface layer concurrent with a second user interface layer. At least a portion of the semi-transparent user interface layer and at least a portion of the second user interface layer may overlap. In this regard, one of the semi-transparent user interface layer or the second user interface layer may at least partially overlie the other. The second user interface layer may, for example, comprise a main user interface layer in which graphical user interfaces for applications, an operating system desktop environment, and/or the like are displayed. Alternatively, as another example, the semi-transparent user interface layer may comprise the main user interface layer and the second user interface layer may comprise a secondary interface layer for displaying additional content.

The semi-transparent user interface layer may be semi-transparent in that when the semi-transparent user interface layer is displayed in the foreground of a display, at least a portion of the underlying second user interface layer is visible through the semi-transparent user interface layer. Accordingly, content displayed within the semi-transparent user interface layer may, itself, be semi-transparent to allow for a user to view content displayed in an underlying user interface layer concurrent with the content displayed in the overlying semi-transparent user interface layer. As another example, the semi-transparent user interface layer may be semi-transparent in that content may only be displayed in a portion of the layer (e.g., in a portion of the semi-transparent user interface layer that does not overlie content displayed in an underlying user interface layer) while portions of the layer in which content is not displayed are fully transparent.

Content displayed in the semi-transparent user interface layer may be displayed outside the boundaries of graphical elements (e.g., windows) displayed in a second user interface layer displayed concurrently with the semi-transparent user interface layer such that content displayed in the semi-transparent user interface layer does not interfere with graphical elements displayed in the second user interface layer.

The semi-transparent user interface layer may be semi-transparent with respect to one or more colors displayed in the semi-transparent user interface layer. For example, the semi-transparent user interface layer may be semi-transparent concerning every color (e.g. 50% transparency). As another example, the semi-transparent user interface layer may have different levels of transparency assigned to different colors. For example, black may be assigned a 100% transparency level and blue may be assigned a 50% transparency level. In an example embodiment, the interface control circuitry 120 is configured to intelligently determine color transparency levels based on content displayed in the second user interface layer when the second user interface layer is underlying the semi-transparent user interface layer. In this regard, the interface control circuitry 120 may be configured to adjust transparency level(s) of the semi-transparent user interface layer based on content displayed in an underlying user interface layer to enable a user to better view content in both the semi-transparent user interface layer and the underlying user interface layer.

The stimulus detection circuitry 118 is configured in some example embodiments to detect a physical stimulus. The physical stimulus may comprise a touch input to a touch screen display on which the semi-transparent user interface layer is displayed. As another example, the physical stimulus may comprise other user interaction with a user interface element of the user interface 116. For example, the physical stimulus may comprise voice input to the user interface 116, such as a voice command made by a user of the apparatus 102. The detected physical stimulus may comprise movement, rotation, and/or the like of the apparatus 102. Non-limiting examples of types of physical stimulus that may be detected by the stimulus detection circuitry 118 include a change in orientation of the apparatus 102, movement of the apparatus 102, an input to a touch screen display on which the semi-transparent user interface layer is displayed, a voice input to the user interface 116, some combination thereof, or the like.

The stimulus detection circuitry 118 may additionally be configured to detect conditions associated with a detected physical stimulus. Non-limiting examples of conditions that may be associated with a detected physical stimulus and detected by the stimulus detection circuitry 118 include a pressure associated with an input to a touch screen display on which the semi-transparent user interface layer is displayed, an electric characteristic associated with an input to a touch screen display on which the semi-transparent user interface layer is displayed, or a vocal characteristic associated with a voice input to the user interface 116, some combination thereof, or the like.

The interface control circuitry 120 may be configured to determine an effect of a detected physical stimulus on display of content in the semi-transparent user interface layer. Various example embodiments, some of which will be described further herein, may be configured to apply a variety of effects to display of content in the semi-transparent user interface layer depending on a type of a detected physical stimulus and/or on characteristics associated with the detected physical stimulus. Accordingly, the effect applicable to a particular detected physical stimulus may depend on settings associated with the semi-transparent user interface layer, content displayed in the semi-transparent user interface layer, graphical elements displayed in a concurrently displayed second (e.g., main) user interface layer, active applications for which a graphical user interface is displayed in the concurrently displayed second user interface layer, predefined user preferences, and/or the like.

The interface control circuitry 120 may be further configured to apply a determined effect by modifying display of content in the semi-transparent user interface layer in response to detection of the physical stimulus. Depending on the determined effect, the interface control circuitry 120 may, for example, cause repositioning of content displayed in the semi-transparent user interface layer, animation of content displayed in the semi-transparent user interface layer, cause display of content that was not previously displayed in the semi-transparent user interface layer, transfer content between the semi-transparent user interface layer and the concurrently displayed second user interface layer, and/or the like.

In an example embodiment, the interface control circuitry 120 is configured to modify display of content in the semi-transparent user interface layer by one or more of transferring displayed content from the semi-transparent user interface layer to the second user interface layer or transferring displayed content from the second user interface layer to the semi-transparent user interface layer. For example, a detected physical stimulus may be determined to be associated with an active application for which a graphical user interface is displayed in the second user interface layer. In this example, modifying display of content in the semi-transparent user interface layer may comprise extracting content from the graphical user interface of the active application and causing display of a representation of the extracted content in the semi-transparent user interface layer. Additionally or alternatively, modifying display of content in the semi-transparent user interface layer may comprise extracting content displayed in the semi-transparent user interface layer and providing the extracted content to the active application for use or consumption by the active application.

For example, a web browser user interface may be displayed in the second user interface layer. A user may perform a predefined physical stimulus to a representation of a uniform resource locator (URL) for a web page that is displayed in the web browser user interface window, such as dragging the URL outside of the web browser user interface window. In response to the predefined physical stimulus, the interface control circuitry 120 may be configured to cause a representation of the URL to be displayed in the semi-transparent user interface layer. As another example, representations of contacts, calendar event reminders, missed calls, new messages, and/or the like associated with an email or other messaging application may be displayed in the semi-transparent user interface layer in response to a physical stimulus. As a further example, the semi-transparent user interface layer may serve as a clipboard for carrying text clips copied from an application interface displayed in the second user interface layer.

Active applications for which a user interface is displayed in the second user interface layer may also consume or otherwise use content displayed in the semi-transparent user interface layer. For example, a new email message creation form may be displayed in the second user interface layer and representations of an image, a contact, and a text clip may be displayed in the semi-transparent user interface layer. A predefined physical stimulus may cause the content for which representations are displayed in the semi-transparent user interface layer to be transferred to and consumed by the email message creation form. For example, a user may drag a representation into the email message creation form. As another example, a user may select a representation (e.g., by clicking on the representation, tapping on the representation, or the like) and the interface control circuitry 120 may determine to provide the content represented by the representation to an appropriate application based on the type of content and/or on the type(s) of open application(s). Thus, for example, by providing physical stimulus configured to cause consumption of the representations of the contact, image, and text clip by the email message creation form, a user may create an email message addressed to the contact and having the image and the text clip appended as part of the message.

In some example embodiments, the interface control circuitry 120 is configured to automatically control a position of a content representation displayed in the semi-transparent user interface layer based at least in part upon a position of one or more graphical elements displayed in the second user interface layer. In this regard, the interface control circuitry 120 may be configured to ensure that a content representation displayed in the semi-transparent user interface layer does not overlap a graphical element displayed in the second user interface layer. Thus, the stimulus detection circuitry 118 may be configured to detect a physical stimulus manipulating a position and/or size of a graphical element displayed in the second user interface layer. The interface control circuitry 120 may, in response, reposition and/or adjust a size of content representation displayed in the semi-transparent user interface layer in response to the detected physical stimulus such that the content representation does not overlap the resized and/or repositioned graphical element displayed in the second user interface layer. In this regard, the interface control circuitry 120 may be configured to adjust content displayed in the semi-transparent user interface layer so that it "bounces" or otherwise remains exterior to outer boundaries of content displayed in the second user interface layer.

The interface control circuitry 120 may, for example, be configured to determine a boundary of a graphical element displayed in the second user interface layer and position a content representation displayed in the semi-transparent user interface layer such that it is displayed outside of the determined boundary. For example, when a graphical element displayed in the second user interface layer comprises a window, such as may be displayed by a windowed operating system, the interface control circuitry 120 may be configured to determine boundaries of the window from the windowed operating system, and position content representation(s) displayed in the semi-transparent user interface layer such that they are outside of the boundaries of the window.

Although heretofore content representations have been described to be displayed in the semi-transparent user interface layer in response to a detected physical stimulus, it will be appreciated that in some embodiments the interface control circuitry 120 may be configured to cause display of content representations in the semi-transparent user interface layer automatically, such as in response to an occurrence of a predefined event associated with an active application. For example, a reminder of a calendar event may be displayed in the semi-transparent user interface layer a predefined amount of time in advance of the event. As another example, an indication of an unread message, voice mail, missed call, and/or the like may be displayed in the semi-transparent user interface layer in response to receipt of the message, voice mail, or missed call.

In some embodiments, the appearance of content representations and indications displayed in the semi-transparent user interface layer may vary over time and/or in response to changing conditions. For example, as a time for a scheduled event approaches, the color and/or size of a reminder for the event displayed in the semi-transparent user interface layer may change to indicate urgency. Additionally or alternatively, the level of transparency of a content representation displayed in the semi-transparent user interface layer may be adjusted by the interface control circuitry 120 to reflect a priority level, predefined user interest level, and/or the like associated with the content. As another example, after the time scheduled for an event has passed, a reminder for the event displayed in the semi-transparent may fade away. Appearance of content displayed in the semi-transparent user interface layer may also be modified depending on a location of the apparatus 102, current weather, time of day, season of the year, user mood, and/or the like.

In an example embodiment the interface control circuitry 120 is configured to determine a mood of a user based at least in part upon a detected physical stimulus. In this regard, the interface control circuitry 120 may determine a mood based on characteristics associated with the detected physical stimulus. Such characteristics may include a frequency of movement of the apparatus 102, pressure associated with a touch input(s) to a touch screen display on which the semi-transparent user interface layer is displayed, electric characteristics of the user's finger(s) used to provide touch input to a touch screen display and/or changes therein, voice characteristics of voice input to the user interface 116 and/or changes therein, some combination thereof, or the like. For example, more rapid and/or exaggerated movement of the apparatus 102 combined with a firmer pressure associated with a touch input may indicate a user is in an aggravated mood. Contrastingly, a gentle pressure associated with a touch input may indicate the user is in a calm or happy mood.

The interface control circuitry 120 may be further configured to determine an effect of the determined mood on display of content in the semi-transparent user interface layer and modify display of content in the semi-transparent user interface layer to reflect the determined mood. For example, if the user is determined to be in an angry mood, content may be highlighted in red, orange, and/or other appropriate color to indicate the user is in an angry mood. As another example, if the user is determined to be in an angry mood, a speed of an animation displayed in the semi-transparent user interface layer may be increased to indicate the angry mood. Alternatively, if the user is determined to be in an angry mood, a color scheme associated with content displayed in the semi-transparent user interface may be changed to calming colors and/or a speed of an animation displayed in the semi-transparent user interface layer may be reduced to calm the user.

In some example embodiments, content displayed in the semi-transparent user interface layer comprises an animation. Accordingly, the interface control circuitry 120 may be configured to determine an effect of a detected physical stimulus on the animation and modify the animation in accordance with the determined effect. For example, the interface control circuitry 120 may be configured to determine an equation modeling a physical stimulus. The interface control circuitry 120 may be configured to determine the equation in accordance with fluid physics, such as based on Navier-Stokes equations, in accordance with particle physics, such as based on Newtonian equations, and/or the like. The interface control circuitry 120 may be further configured to modify the animation in accordance with the determined equation.

For example, the animation may comprise rolling marbles and the interface control circuitry 120 may modify a display position of the marbles and/or a rate/direction of the rolling marbles in accordance with a Newtonian physics modeling of a detected physical stimulus. In so doing, the interface control circuitry 120 may take into account a rate or severity associated with motion of the apparatus 102, a rate and/or pressure associated with a touch input, and/or the like. As another example, the animation may comprise an animation of a fluid and the interface control circuitry 120 may be configured to modify display of the fluid animation in accordance with a fluid physics modeling determined based on detected physical stimulus.

As another example, the interface control circuitry 120 may be configured to modify an animation displayed in the semi-transparent user interface layer based on user interaction with content displayed in the second user interface layer. In this regard, the interface control circuitry 120 may be configured to detect and recognize content displayed in the second user interface layer and modify an animation displayed in the semi-transparent user interface layer based on the recognized content. For example, if a user is interacting with a web browser in the second user interface layer and the web page the user is viewing contains an image of cloudy scenery, the interface control circuitry 120 may cause an animation of clouds to be displayed in the semi-transparent user interface layer. As another example, the interface control circuitry 120 may detect a color scheme/pattern of content displayed in the second user interface layer and modify an animation displayed in the semi-transparent user interface layer based on the detected color scheme/pattern.

In addition to modifying an animation displayed in the semi-transparent user interface layer based on a detected physical stimulus, the interface control circuitry 120 may be configured to modify the animation in response to other events. For example, the interface control circuitry 120 may modify an animation based on weather conditions, time of day, season of the year, and/or the like. The interface control circuitry 120 may additionally or alternatively be configured to modify an animation based on a mood of a user of the apparatus 102, such as may be determined based on detected physical stimulus and/or characteristics associated therewith as previously described.

Figure 3:
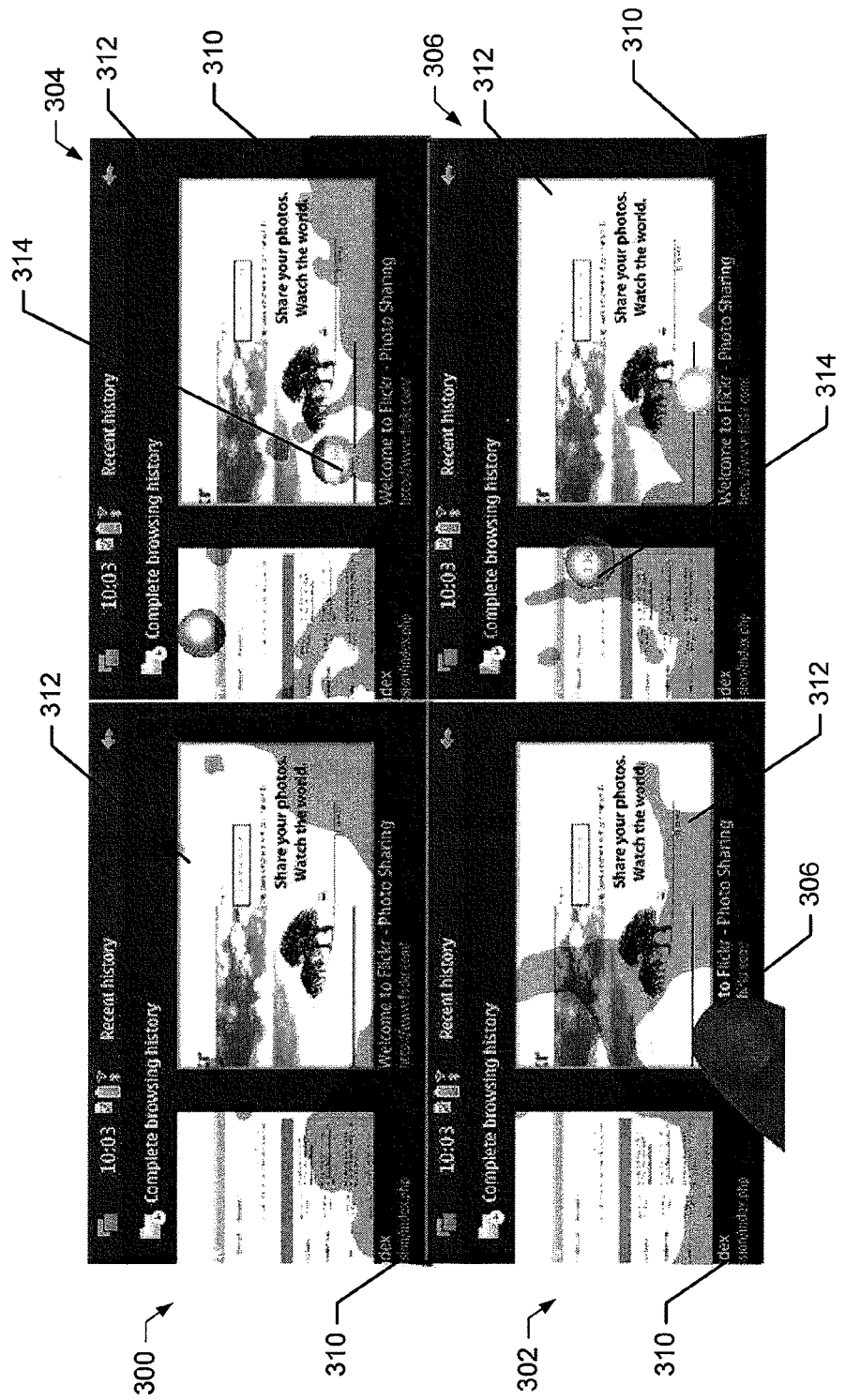
FIG. 3 illustrates screen captures of an example user interface according to an example embodiment of the invention.

Referring now to FIG. 3, illustrates screen captures of an example user interface according to an example embodiment of the invention. In this regard, the screen captures in FIG. 3 illustrate a slimy fluid animation 310 in a semi-transparent user interface layer. The semi-transparent slimy fluid animation 310 is displayed in the foreground overlapping a second user interface layer in which a web browser application window 312 is displayed, as illustrated in the screen capture 300. Referring now to the screen capture 302, a user may manipulate the application window 312 using a touch input 306. The touch input 306 may comprise dragging/throwing an application content item (contact, URL, image, and/or the like) outside of the boundaries of the application window 312. As may be seen in the screen capture 304, a bubble 314 has been generated in the semi-transparent user interface layer that is representative of the content item dragged/thrown outside of the boundaries of the application window. The bubble 314 may float within the semi-transparent user interface layer in accordance with the constraints/characteristics of the slimy fluid animation in response to detected physical stimulus. Thus, for example, as illustrated in the screen capture 306, the position of the bubble 314 may vary as it floats in the semi-transparent user interface layer.

A user may activate the bubble 314 by selecting it (e.g., by tapping the bubble 314 using a touch gesture). When bubble 314, the content represented by the bubble 314 may become usable in the context of an active application. For example, if a message editor is open and a selected bubble contains an image, then image may be appended as part of the message by the interface control circuitry 120.

Figure 4:
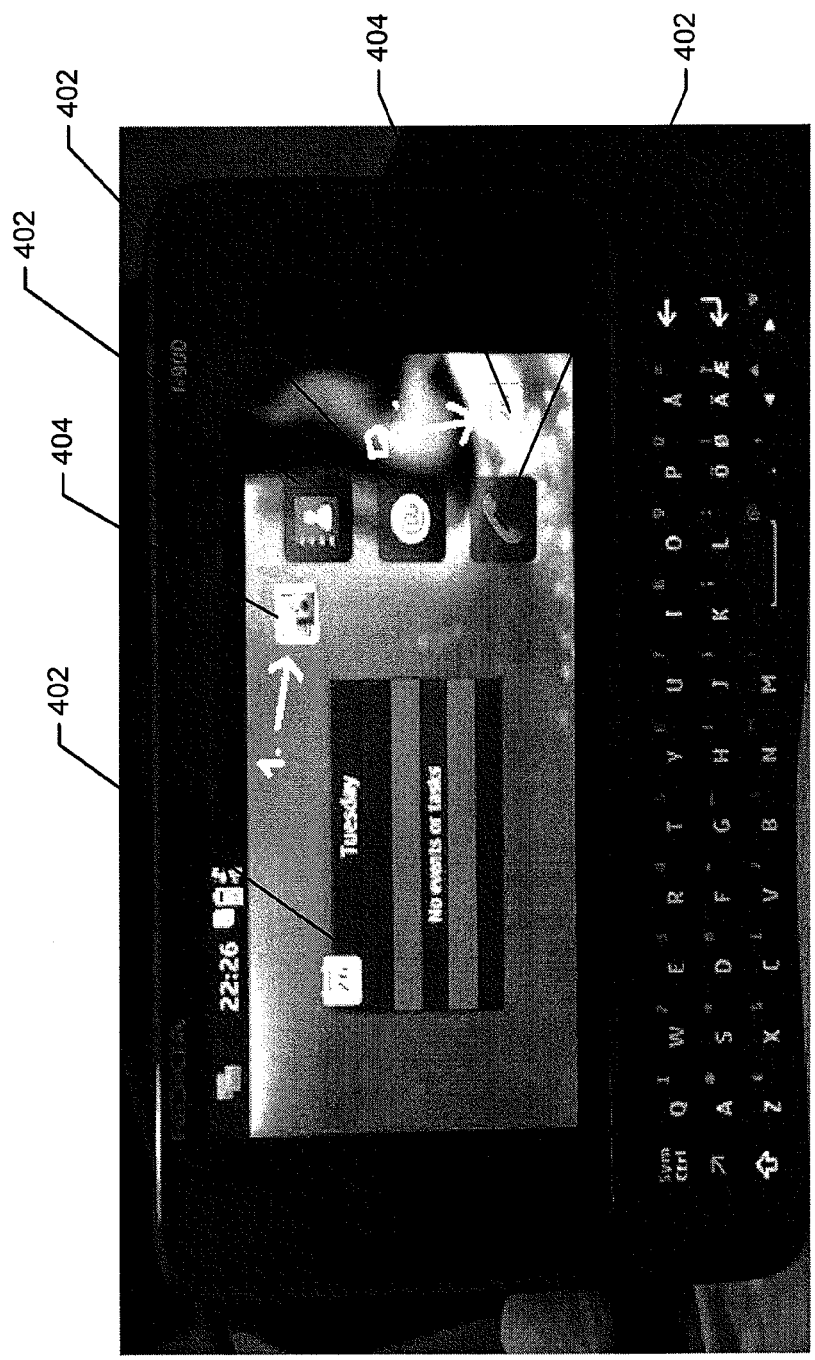
FIG. 4 illustrates a screen capture of an example user interface according to an example embodiment of the invention.

Referring now to FIG. 4, a screen capture of an example user interface according to another example embodiment is illustrated. In the embodiment illustrated in FIG. 4, a plurality of rectangular icons 404 are displayed in a semi-transparent user interface layer concurrently with a plurality of graphical elements 402 displayed in a second user interface layer. The icons 404 may represent reminders such as upcoming meeting, new message, and/or the like and may "float" within the semi-transparent user interface layer. The interface control circuitry 120 may control the position of the icons 404 such that the icons 404 are positioned in a safe area where there is no conflicting touch functionality. In this regard, the icons 404 may be positioned outside the boundaries of the borders of the graphical elements 402. For example, the icons 404 may bounce from the borders of windows displayed in the second user interface layer. A user may consume a "floating reminder" by selecting it. If a selected reminder represents a new message, the message may be opened for reading when the reminder is selected. Selection of an icon representing a calendar reminder may cause the interface control circuitry 120 to open the corresponding calendar entry for viewing by the user.

Figure 5:
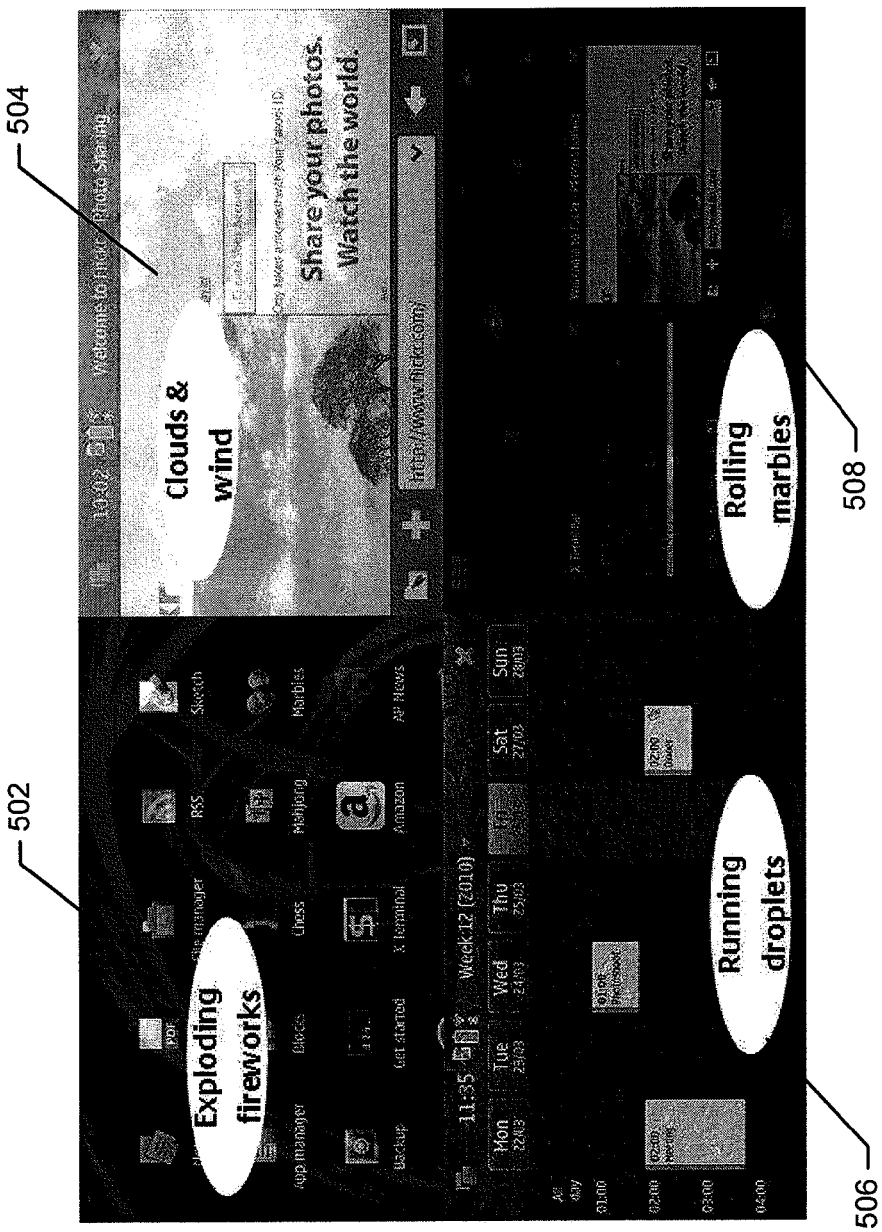
FIG. 5 illustrates screen captures of example user interfaces according to example embodiments of the invention.

FIG. 5 illustrates screen captures of example user interfaces according to example embodiments of the invention. In this regard, FIG. 5 illustrates screen captures of several example animations that may be displayed in a semi-transparent user interface layer. The screen capture 502 illustrates an exploding fireworks animation. In this regard, a semi-transparent animation of exploding fireworks may be displayed.

The screen capture 504 illustrates a semi-transparent clouds and wind animation. The semi-transparent clouds illustrated in the screen capture 504 may be animated to travel across the display screen as if blown by wind. The speed of the clouds may vary based on a detected physical stimulus. Characteristics of the clouds may also vary depending on various conditions. For example, if the weather is rainy, rain clouds may be displayed. If the weather is sunny, then fewer clouds may be displayed and those clouds that are displayed may comprise non-rain clouds.

The screen capture 506 illustrates a semi-transparent animation of running water droplets. The droplets may travel across the screen in accordance with detected physical stimulus. Accordingly, a speed, direction of travel, and/or the like associated with the animated droplets may be varied by the interface control circuitry 120 in response to a detected physical stimulus.

The screen capture 508 illustrates a semi-transparent animation of rolling marbles. The marbles may travel across the screen in accordance with detected physical stimulus. Accordingly, a speed, direction of travel, and/or the like associated with the animated marbles may be varied by the interface control circuitry 120 in response to a detected physical stimulus.

Figure 6:
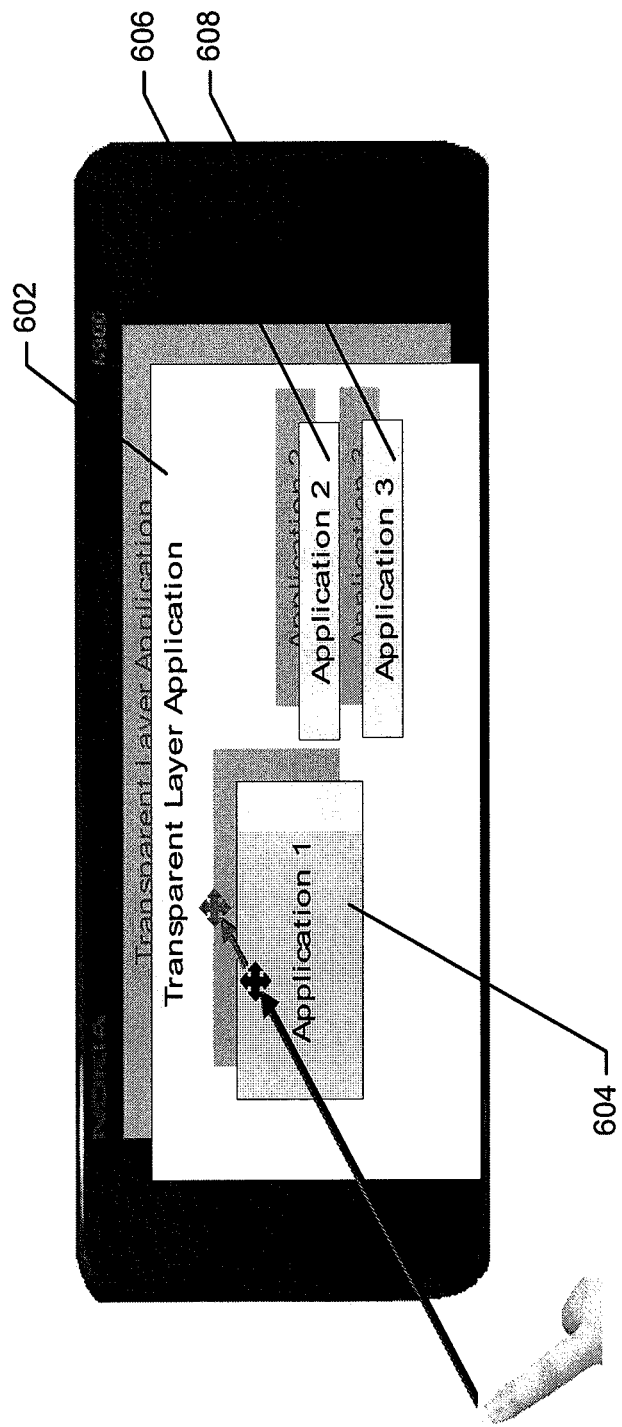
FIG. 6 illustrates an implementation of a semi-transparent user interface layer according to an example embodiment of the invention.

FIG. 6 illustrates an implementation of a semi-transparent user interface layer according to an example embodiment of the invention. In this regard, FIG. 6 illustrates an embodiment wherein the semi-transparent user interface layer comprises a semi-transparent application window configured for display by a user interface system (e.g., windowed operating system) concurrently with one or more other user interface layers. Referring to FIG. 6, the semi-transparent user interface layer application window 602 is displayed concurrently with application windows 604, 606, and 608, which are displayed in a second user interface layer that overlaps the semi-transparent user interface layer application window 602. Accordingly, a semi-transparent user interface layer may be implemented as a window having a semi-transparent appearance so as to allow overlapping user interface elements to be viewable concurrent with content displayed in the semi-transparent window.

Some example embodiments provide extensions to the semi-transparent user interface features previously described. For example, the interface control circuitry 120 may be configured to hide a semi-transparent user interface layer in response to a predefined physical stimulus. Similarly, the interface control circuitry 120 may be configured to display a semi-transparent user interface layer in response to a predefined physical stimulus. As another example, the interface control circuitry 120 may be configured to toggle display of the semi-transparent user interface layer (e.g., show/hide the semi-transparent user interface layer) in response to user input to the user interface 116. For example, a button, soft key, and/or the like may be configured to toggle display of the semi-transparent user interface layer when selected by a user.

In one example embodiment, the interface control circuitry 120 is configured to bind two or more content items displayed in the semi-transparent user interface layer into groups. The interface control circuitry 120 may group content items based on a category of content items (e.g., a contact group, an event reminder group, image group, and/or the like). As another example, the interface control circuitry 120 may group a plurality of content items in response to user input. For example, a user may select to group a contact content item, image content item, and text clip content item related to a single work project as a single grouped content item. In this regard, a user may organize content items in a manner that allows a user to logically work with content items displayed in the semi-transparent user interface layer. The grouped content items may accordingly server to organize content items. The interface control circuitry 120 may be configured to control display of grouped content items as a cohesive group.

Some embodiments may provide for sharing and/or downloading of semi-transparent animated user interface layers. For example, users may synchronize and/or share animation styles and settings with friends, such as through a web service, email, device-to-device communication, and/or the like. Similarly, a user may be able to download semi-transparent user interface layer animations and styles (e.g., animation "skins") from a download service over a network.

As another example extension, the semi-transparent user interface layer may function as a "screensaver." For example, when the apparatus 102 is preparing to enter a sleep state (e.g., after an idle period), the interface control circuitry 120 may cause the semi-transparent user interface layer to utilize an animation effect of the semi-transparent user interface layer as a screen saver until the apparatus 102 enters a sleep state.

As a further example, the interface control circuitry 120 may be configured to bring the semi-transparent user interface layer fully to the foreground such that it is no longer semi-transparent in response to a physical stimulus to allow a user to modify settings of the semi-transparent user interface layer, activate/deactivate the semi-transparent user interface layer, and/or the like.

The interface control circuitry 120 may additionally be configured to cause additional details about a content item displayed in the semi-transparent user interface layer without opening the content item as an application or applet in the second user interface layer. Accordingly, a user may view metadata or other more descriptive data associated with the content item without fully opening or consuming the content item in the second user interface layer (e.g., main user interface layer).

As an additional example, the interface control circuitry 120 may be configured to determine and/or adjust the transparency level(s) of the semi-transparent user interface layer in ways in addition to the aforementioned examples. For example, the interface control circuitry 120 may be configured to utilize an equation determined to model a physical stimulus at a location of the semi-transparent user interface layer (e.g., at an x,y coordinate of the semi-transparent user interface layer) as a factor in setting a transparency level of that position and/or of a related position. The interface control circuitry 120 may additionally be configured to utilize a predefined mask, to define one or more of the boundaries of transparent areas or the boundaries of an animation in the "semi-transparent user interface layer." The mask may comprise a stable geometric form or a form changing over time in accordance with a predefined algorithm.

The interface control circuitry 120 may also be configured to apply transparency levels within the semi-transparent user interface layer. In this regard, some content items may be made transparent towards an animation carrying them and some content items may not be made transparent towards the animation. The interface control circuitry 120 may also adjust a global transparency ratio of the semi-transparent user interface layer, such as based on predefined user preferences, in response to diction of a predefined physical stimulus, in response to occurrence of a predefined event, and/or the like.

In some example embodiments, the interface control circuitry 120 is configured to cause display of a plurality of semi-transparent user interface layers. Each of the plurality of semi-transparent user interface layers may be visible all of the time or may be activated/deactivated in response to one or more pre-defined rules, such as, expiration of a timeout period after a user input, a predefined user input, detection of a predefined physical stimulus, and/or the like.

In embodiments wherein a plurality of semi-transparent user interface layers are displayed, each user interface layer may be configured for display of a specific type(s) of content items. For example, the interface control circuitry 120 may be configured to cause display of content items representing images in a first semi-transparent user interface layer and content items representing messages in a second semi-transparent user interface layer. As another example, content items may be displayed in semi-transparent user interface layers in accordance with an associated priority. For example, high priority content items may be displayed in a first semi-transparent user interface layer and low priority content items may be displayed in a second semi-transparent user interface layer.

The interface control circuitry 120 may be configured to transfer a content item from a first semi-transparent user interface layer to a second semi-transparent user interface layer. The interface control circuitry 120 may transfer a content item from one layer to another based on a predefined criteria or event (e.g., a change in a priority associated with a content item, detected physical stimulus, and/or the like), in response to a user input moving a content item from one layer to another, and/or the like. For example, a user may drag and drop a content item between semi-transparent user interface layers.

In an example embodiment, a semi-transparent layer may be divided into a plurality of sections (e.g., based on x, y coordinates). Each section may be configured for display of a specific type(s) of content items. For example, the interface control circuitry 120 may be configured to cause display of content items representing images in a first section of the semi-transparent user interface layer and content items representing messages in a second section of the semi-transparent user interface layer. As another example, content items may be displayed in sections of the semi-transparent user interface layer in accordance with an associated priority. For example, high priority content items may be displayed in a first section of the semi-transparent user interface layer and low priority content items may be displayed in a second section of the semi-transparent user interface layer.

In one example embodiment, the interface control circuitry 120 is configured to toggle which of two or more displayed user interface layers is semi-transparent. For example, the interface control circuitry 120 may be configured to arrange display of two or more user interface layers by controlling which user interface layer(s) is displayed in the background underlying one or more other user interface layers. Accordingly, the interface control circuitry 120 may be configured to cause a user interface layer(s) displayed overlying another user interface layer to be displayed as a semi-transparent user interface layer.

In a further example embodiment, the interface control circuitry 120 is configured to bring a semi-transparent user interface layer to the foreground (e.g., overlying a second user interface layer), send a semi-transparent user interface layer to the background (e.g., underlying a second user interface layer), and/or the like. The interface control circuitry 120 may be configured to do so in response to detection of a predefined physical stimulus, occurrence of a predefined event, and/or the like.

In an example embodiment, by toggling which of two or more displayed user interface layers is semi-transparent and/or by sending a semi-transparent user interface layer to the background, the "second user interface layer" may be made to appear semi-transparent, whereas the "semi-transparent user interface layer", as defined earlier may be modified such that it is not transparent at all, but appears solid in the background. In this example embodiment, the semi-transparent user interface layer may maintain the same properties it had when semi-transparent even when displayed as a solid background user interface layer. Accordingly, the interface control circuitry 120 may be configured to modify display of content in the semi-transparent layer according to any example described herein even when the semi-transparent layer is displayed as a solid layer in the background of the second user interface layer. As such, it will be appreciated that the interface control circuitry 120 may be configured to cause a plurality of at least partially overlapping user interface layers to be displayed. Content displayed in one or more of the displayed user interface layers may be modified or controlled by the interface control circuitry 120 in accordance with any embodiment described herein even though the user interface layer may not necessarily be semi-transparent. Accordingly, the interface control circuitry 120 may, for example, be configured to modify content displayed in a non-transparent user interface layer in response to a detected physical stimulus.

In another example embodiment, the interface control circuitry 120 may be configured to cause display of a semi-transparent user interface layer in between two or more other user interface layers. In this regard, the interface control circuitry 120 may be configured to cause a semi-transparent user interface layer to be displayed in the middle of a stack of user interface layers. As another example, the interface control circuitry 120 may be configured to cause display of a semi-transparent user interface layer in between a stack of two or more displayed windows.

Figure 7:
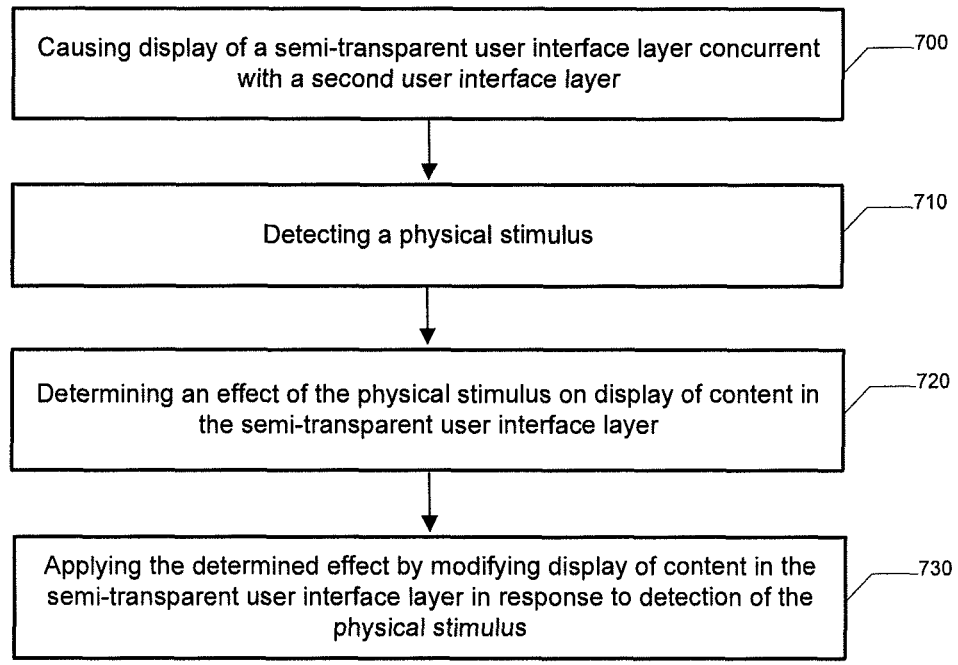
FIG. 7 illustrates a flowchart according to an example method for providing an enhanced user interface according to an example embodiment of the invention.

FIG. 7 illustrates a flowchart according to an example method for providing an enhanced user interface according to an example embodiment of the invention. The operations illustrated in and described with respect to FIG. 7 may, for example, be performed by, with the assistance of, and/or under the control of one or more of the processor 110, memory 112, communication interface 114, user interface 116, stimulus detection circuitry 118, or interface control circuitry 120. Operation 700 may comprise causing display of a semi-transparent user interface layer concurrent with a second user interface layer. Operation 710 may comprise detecting a physical stimulus. Operation 720 may comprise determining an effect of the physical stimulus on display of content in the semi-transparent user interface layer. Operation 730 may comprise applying the determined effect by modifying display of content in the semi-transparent user interface layer in response to detection of the physical stimulus.

FIG. 7 is a flowchart of a system, method, and computer program product according to example embodiments of the invention. It will be understood that each block of the flowchart, and combinations of blocks in the flowchart, may be implemented by various means, such as hardware and/or a computer program product comprising one or more computer-readable mediums having computer readable program instructions stored thereon. For example, one or more of the procedures described herein may be embodied by computer program instructions of a computer program product. In this regard, the computer program product(s) which embody the procedures described herein may be stored by one or more memory devices of a mobile terminal, server, or other computing device and executed by a processor in the computing device. In some embodiments, the computer program instructions comprising the computer program product(s) which embody the procedures described above may be stored by memory devices of a plurality of computing devices. As will be appreciated, any such computer program product may be loaded onto a computer or other programmable apparatus to produce a machine, such that the computer program product including the instructions which execute on the computer or other programmable apparatus creates means for implementing the functions specified in the flowchart block(s). Further, the computer program product may comprise one or more computer-readable memories (e.g., the memory 112) on which the computer program instructions may be stored such that the one or more computer-readable memories can direct a computer or other programmable apparatus (e.g., the apparatus 102) to function in a particular manner, such that the computer program product comprises an article of manufacture which implements the function specified in the flowchart block(s). The computer program instructions of one or more computer program products may also be loaded onto a computer or other programmable apparatus (e.g., an apparatus 102) to cause a series of operations to be performed on the computer or other programmable apparatus to produce a computer-implemented process such that the instructions which execute on the computer or other programmable apparatus implement the functions specified in the flowchart block(s).

Accordingly, blocks of the flowchart support combinations of means for performing the specified functions. It will also be understood that one or more blocks of the flowchart, and combinations of blocks in the flowchart, may be implemented by special purpose hardware-based computer systems which perform the specified functions, or combinations of special purpose hardware and computer program product(s).

The above described functions may be carried out in many ways. For example, any suitable means for carrying out each of the functions described above may be employed to carry out embodiments of the invention. In one embodiment, a suitably configured processor (e.g., the processor 110) may provide all or a portion of the elements. In another embodiment, all or a portion of the elements may be configured by and operate under control of a computer program product. The computer program product for performing the methods of embodiments of the invention includes a computer-readable storage medium (e.g., the memory 112), such as the non-volatile storage medium, and computer-readable program code portions, such as a series of computer instructions, embodied in the computer-readable storage medium.

As such, then, some embodiments of the invention provide several advantages to computing devices and computing device users. Some example embodiments provide a semi-transparent user interface layer that is displayed concurrent with a second user interface layer. In some example embodiments, the semi-transparent user interface layer is configured to display interactive animations, information, and/or other content concurrent with information, application interface(s), and/or the like displayed in the second user interface layer. In this regard, the semi-transparency of the semi-transparent user interface layer may allow for display of additional content without interfering with content displayed in the second user interface layer. Some example embodiments further provide for detection of a physical stimulus, such as physical stimulus of a display on which the semi-transparent user interface is displayed and/or physical stimulus of a computing device on which the semi-transparent user interface is displayed. Some such example embodiments are configured to apply an effect to content displayed in the semi-transparent user interface layer in response to detection of physical stimulus. Some example embodiments utilize unused (e.g., empty) space to display content in a semi-transparent user interface layer to improve usage satisfaction and realism by providing an animating effect to the content. Accordingly, content displayed in the semi-transparent user interface may be user-interactive content providing a visually rich user experience, which may enhance user experience over conventional user interfaces.

Many modifications and other embodiments of the inventions set forth herein will come to mind to one skilled in the art to which these inventions pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the invention. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the invention. In this regard, for example, different combinations of elements and/or functions than those explicitly described above are also contemplated within the scope of the invention. Although specific terms are employed herein, they are used in a generic and descriptive sense only and not for purposes of limitation.

What is claimed is:

1. A method comprising:
   causing display of a semi-transparent user interface layer concurrent with a second user interface layer, wherein a graphical user interface, including displayed content, of an active application is displayed in the second user interface layer and wherein at least a portion of the semi-transparent user interface layer and at least a portion of the second user interface layer overlap;
   extracting the displayed content from the graphical user interface of the active application;
   modifying display of the semi-transparent user interface layer by causing a representation of the extracted content to be displayed in the semi-transparent user interface layer, such that the representation of the extracted content is displayed in the semi-transparent user interface layer while the extracted content continues to be displayed in the graphical user interface displayed in the second user interface layer;
   further extracting the displayed representation of the extracted content from the semi-transparent user interface layer and providing the further extracted content to an active application of the second user interface layer in order for said active application of the second user interface to use or consume the further extracted content; and
   determining an appropriate application to which the further extracted content is to be provided based on at least one of:
   a type of content of the further extracted content, or
   a type of one or more active applications.

2. The method of claim 1, further comprising:
   determining a boundary displayed in the second user interface layer; and
   wherein the representation of the extracted content is displayed in the semi-transparent user interface layer outside of the determined boundary.

3. The method of claim 1, further comprising:
   detecting a physical stimulus;
   determining a mood of a user based at least in part upon the physical stimulus;
   determining an effect of the determined mood on display of content in the semi-transparent user interface layer; and
   modifying display of content in the semi-transparent user interface layer to reflect the determined mood.

4. The method of claim 1, wherein an animation is displayed in the semi-transparent user interface layer, the method further comprises:
   detecting a physical stimulus;
   determining an equation modeling the physical stimulus; and
   modifying the animation in accordance with the determined equation.

5. An apparatus comprising at least one processor and at least one memory storing computer program code, wherein the at least one memory and stored computer program code are configured, with the at least one processor, to cause the apparatus to at least:
  cause display of a semi-transparent user interface layer concurrent with a second user interface layer, wherein a graphical user interface, including displayed content, of an active application is displayed in the second user interface layer and wherein at least a portion of the semi-transparent user interface layer and at least a portion of the second user interface layer overlap;
  extract the displayed content from the graphical user interface of the active application;
  modify display of the semi-transparent user interface layer by causing a representation of the extracted content to be displayed in the semi-transparent user interface layer, such that the representation of the extracted content is displayed in the semi-transparent user interface layer while the extracted content continues to be displayed in the graphical user interface displayed in the second user interface layer,
  further extract the displayed representation of the extracted content from the semi-transparent user interface layer and providing the further extracted content to an active application of the second user interface layer in order for said active application of the second user interface layer to use or consume the further extracted content; and
  determine an appropriate application to which the further extracted content is to be provided based on at least one of:
    a type of content of the further extracted content, or
    a type of one or more active applications.

6. The apparatus of claim 5, wherein the at least one memory and stored computer program code are configured, with the at least one processor, to further cause the apparatus to:
  determine a boundary displayed in the second user interface layer; and
  wherein the representation of the extracted content is displayed in the semi-transparent user interface layer outside of the determined boundary.

7. The apparatus of claim 5, wherein the at least one memory and stored computer program code are configured, with the at least one processor, to further cause the apparatus to:
  detect a physical stimulus;
  determine a mood of a user based at least in part upon the physical stimulus;
  determine an effect of the determined mood on display of content in the semi-transparent user interface layer; and
  modify display of content in the semi-transparent user interface layer to reflect the determined mood.

8. The apparatus of claim 5, wherein an animation is displayed in the semi-transparent user interface layer; and wherein the at least one memory and stored computer program code are further configured, with the at least one processor, to cause the apparatus to:
  detect a physical stimulus;
  determine an equation modeling the physical stimulus; and
  modify the animation in accordance with the determined equation.

9. The apparatus of claim 5, wherein the semi-transparent user interface layer comprises a semi-transparent application window configured for display by a user interface system.

10. The apparatus of claim 5, wherein the apparatus comprises or is embodied on a mobile device, the mobile device comprising user interface circuitry and user interface software stored on one or more of the at least one memory; wherein the user interface circuitry and user interface software are configured to:
  facilitate user control of at least some functions of the mobile phone through use of a display; and
  cause at least a portion of a user interface of the mobile phone to be displayed on the display to facilitate user control of at least some functions of the mobile phone.

11. A computer program product comprising at least one tangible computer-readable storage medium having computer-readable program instructions stored therein, the computer-readable program instructions being configured to, upon execution, direct an apparatus to at least:
  cause display of a semi-transparent user interface layer concurrent with a second user interface layer, wherein a graphical user interface, including displayed content, of an active application is displayed in the second user interface layer and wherein at least a portion of the semi-transparent user interface layer and at least a portion of the second user interface layer overlap;
  extract the displayed content from the graphical user interface of the active application;
  modify display of the semi-transparent user interface layer by causing a representation of the extracted content to be displayed in the semi-transparent user interface layer, such that the representation of the extracted content is displayed in the semi-transparent user interface layer while the extracted content continues to be displayed in the graphical user interface displayed in the second user interface layer;
  further extract the displayed representation of the extracted content from the semi-transparent user interface layer and providing the further extracted content to an active application of the second user interface layer in order for said active application of the second user interface layer to use or consume the further extracted content; and
  determine an appropriate application to which the further extracted content is to be provided based on at least one of:
    a type of content of the further extracted content, or
    a type of one or more active applications.

12. The computer program product of claim 11, wherein the program instructions are further configured to, upon execution, direct the apparatus to:
  detect a physical stimulus;
  determine a mood of a user based at least in part upon the physical stimulus;
  determine an effect of the determined mood on display of content in the semi-transparent user interface layer; and
  modify display of content in the semi-transparent user interface layer to reflect the determined mood.

13. The method of claim 1, wherein the displayed content is extracted from the graphical user interface of the active application in response to user input.

14. The method of claim 1, further comprising:
  causing display of further content in the semi-transparent user interface layer; and
  extracting the further content from the semi-transparent user interface layer and providing the further content to the active application, for which the graphical user interface is displayed in the second user interface layer, in order for the active application to use or consume the further content extracted from the semi-transparent user interface layer.

15. The method of claim 1, wherein the representation of the extracted content displayed in the semi-transparent user interface layer is further extracted from the semi-transparent user interface layer and provided to said active application of the second user interface layer in response to user input.

16. The apparatus of claim 5, wherein the displayed content is extracted from the graphical user interface of the active application in response to user input.

17. The apparatus of claim 5, wherein the at least one memory and stored computer program code are configured, with the at least one processor, to further cause the apparatus to:
cause display of further content in the semi-transparent user interface layer; and
extract the further content from the semi-transparent user interface layer and provide the further content to the active application, for which the graphical user interface is displayed in the second user interface layer, in order for the active application to use or consume the further content extracted from the semi-transparent user interface layer.

18. The apparatus of claim 5, wherein the representation of the extracted content displayed in the semi-transparent user interface layer is further extracted from the semi-transparent user interface layer and provided to said active application of the second user interface layer in response to user input.

19. The computer program product of claim 11, wherein the displayed content is extracted from the graphical user interface of the active application in response to user input.

* * * * *